United States Patent Office 3,072,715
Patented Jan. 8, 1963

3,072,715
SYNTHESIS OF THE AROMATIC BORON-CARBON BOND
George W. Willcockson, Anaheim, Calif., assignor to United States Borax & Chemical Corporation, Los Angeles, Calif., a corporation of Nevada
No Drawing. Filed Nov. 24, 1958, Ser. No. 775,707
2 Claims. (Cl. 260—500)

This invention relates as indicated to a method for preparing monoarylboranes. A number of methods have been used by prior art workers in an attempt to produce the aromatic boron-carbon bond. However, these methods have all had various disadvantages, such as the necessity for high temperature reactions, costly ingredients, poor yields, etc.

Prior art workers have used hydrogenation catalysts such as platinum-carbon and palladium-carbon to produce phenylboron dichloride; however, such reactions were carried out at temperatures of 500–600° C. since these workers have reported that no reaction takes place under about 500° C.

With the use of the present invention monoarylboranes can be produced at temperatures as low as 50–60° C., and further it is not necessary to go above 250° C. although higher temperatures can be used if desired.

It is the principal object of this invention to provide a novel method for producing monoarylboranes which is cheaper, more efficient and easier than previously known methods. Other objects will appear as the description proceeds.

To the accomplishment of the foregoing and related ends, the invention then comprises the features hereinafter fully described and particularly pointed out in the claims, the following description setting forth in detail certain illustrative embodiments of the invention, these being indicative, however, of but a few of the ways in which the principle of the invention may be employed.

The present invention is predicated upon the discovery that an aryl group and a boron trihalide (the halogen of said boron trihalide having an atomic number of at least 17 and not greater than 35) will react at relatively low temperatures in the presence of an acid type metal catalyst to produce aromatic carbon-boron bonds.

Broadly stated, the present invention comprises the method of producing monoarylboranes which comprises reacting a boron compound selected from the class consisting of boron chloride and boron bromide with an aryl group selected from the class consisting of benzene, alkyl substituted benzene, halogen substituted benzene, aryl substituted benzene, biphenyl and naphthalene in the presence of a catalyst selected from the class consisting of aluminum chloride, aluminum bromide, zirconium tetrachloride, gallium trichloride, and chromium trichloride.

The foregoing broadly stated method can be used to produce arylboron dihalides which can subsequently be converted to the corresponding boronic acid, dialkyl arylboronate, or aryldiaminoborane by hydrolysis, alcoholysis or aminolysis, respectively.

The process of the present invention can be illustrated by the following typical equation:

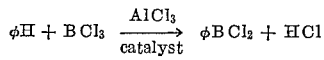

It will be seen from the foregoing equation, that the present process comprises the direct borylation of an aromatic compound in the presence of one of the catalysts noted above. Further, if the phenylboron dichloride formed in the foregoing reaction is treated with water it is converted to benzeneboronic acid.

So that the present invention will be more clearly understood, the following examples are given:

I

A 1000-ml. three-necked flask was equipped with a stirrer, an ice water-cooled addition buret for adding a measured volume of liquid boron trichloride, a thermometer, and an ice water-cooled reflux condenser. The apparatus was dried carefully and purged with dry nitrogen. The reaction flask was charged with 87.3 grams of anhydrous aluminum chloride, 88.0 grams of boron trichloride, 250 ml. of dry n-octane, and 250 ml. of dry benzene. The boron trichloride addition buret was then replaced with a nitrogen inlet tube.

As a slow stream of nitrogen was passed through the apparatus, the mixture was stirred rapidly and warmed to reflux over a 2.5 hour period. During this period, the reaction mixture turned dark and hydrogen chloride was evolved. The reflux was maintained for an additional 44.5 hours as the temperature increased slowly from 58.5 to 67° C.

The excess boron trichloride was then distilled from the reaction mass, the remaining portion of the reaction mass was filtered through a fritted glass tube and the residual solid was washed with dry benzene. Distillation of the filtrate gave phenyldichloroborane having a boiling point of 60–64° C. at 9 mm. Treatment of the hydrocarbon fraction and the distillation residue with water yielded additional product in the form of benzeneboronic acid.

The following examples illustrate the production of arylboronic acids wherein the aryldihaloborane formed is not separated as such, but is hydrolyzed to produce the desired boronic acid.

II

A 500-ml. three-necked flask was equipped with a stirrer and ice water-cooled addition buret for adding a measured volume of liquid boron trichloride, a thermometer, and an ice water-cooled reflux condenser. A Dry Ice condenser was placed at the top of the reflux condenser and connected via a calcium chloride drying tube to a trap containing an aqueous base. The apparatus was carefully dried and charged with 26.7 grams of anhydrous aluminum chloride, 23.4 grams of boron trichloride, and 250 ml. of dry benzene. The addition buret was then removed after the addition of boron trichloride. The reaction mixture was stirred rapidly and heated to 70° C. over a 2.5 hour period. Hydrogen chloride was evolved during this period and trapped in the aqueous standard base. Refluxing was continued for an additional 10.5 hours at 70–75° C.

The excess boron trichloride was distilled and the remaining reaction mass was hydrolyzed by pouring slowly into ice water. The resulting mixture was filtered and the filtrate transferred to a separatory funnel. The layers were separated and the aqueous layer extracted with three 100-ml. portions of ether. The combined organic extract yielded a brown solid residue upon evaporation of the ether. Recrystallation of this material from water gave colorless crystals of benzeneboronic acid, melting point 206–207° C., and possessed a neutralization equivalent of 120 in the presence of mannitol (theory, 121.8).

III

Example II was repeated with aluminum bromide instead of aluminum chloride as the catalyst. The phenylboron dihalide which was produced was hydrolyzed in water. The resultant product isolated as benzeneboronic acid anhydride, and showed 10.2% boron on analysis (theory, 10.4% boron).

IV

The reaction apparatus was assembled as in Example II employing a liter flask. The flask was charged with 500-ml. of dry toluene, 50 grams of anhydrous aluminum chloride, and 88 grams of boron trichloride.

The mixture was stirred rapidly and heated slowly to about 71° C. for about 6 hours. During the heating period the reaction mass turned dark and hydrogen chloride was evolved.

The reaction was allowed to reflux for about 12 hours. The excess boron trichloride was distilled and the remaining reaction mixture was poured into ice water. The hydrolyzed material was transferred into a separatory funnel and extracted as in Example II with ether. The organic extracts were combined and evaporated to dryness to yield a slightly colored solid residue. Recrystallization of this residue from water yielded colorless crystals of tolueneboronic acid whose neutralization equivalent in the presence of mannitol was 132.7 (theory, 136.0).

V

The apparatus of Example II was charged with 7 grams of anhydrous aluminum bromide, 275 ml. of dry toluene, and 15 ml. of boron tribromide. The resulting brown solution was heated at 75–97° C. for about 13 hours, during which period hydrogen bromide was evolved. The reaction mixture was poured into a well-stirred ice-water mixture. Subsequent extraction with four 200-ml. portions of ether and evaporation of the combined organic extracts at reduced pressure gave 14 grams of a slightly colored residue of tolueneboronic acid anhydride. This residue was taken up in 500 ml. of hot water, treated with decolorizing carbon and filtered. Upon cooling, colorless crystals of the boronic acid separated; this material had a melting point of 222–226° C. and a boron content of 7.83% (theory, 7.96%).

VI

A 300-ml. three-necked flask was equipped as described in Example II. The apparatus was assembled, carefully dried and purged with nitrogen.

The flask was charged with 90 grams of naphthalene (recrystallized from alcohol and dried.) The crystals were heated above their melting point in nitrogen for about ten minutes. After cooling, 32 grams of boron trichloride, 125 ml. of hydrocarbon solvent and 0.8 gram of anhydrous aluminum chloride were introduced. The mixture was heated with stirring for about twelve hours at 65–70° C., during such heating hydrogen chloride was evolved. Excess boron trichloride was distilled and the remaining mixture was poured into a well-stirred ice water-ether mixture. The layers were separated and the aqueous layer was extracted with two 200-ml. portions of ether. The combined organic extracts were extracted with three 125-ml. portions of 2% NaOH. The basic extract was then acidified to the Congo red endpoint with 5% HCl and extracted with two 120-ml. portions of ether. The ether was evaporated and a solid crude product was obtained. After recrystallization from benzene and drying, a crystalline material having a M.P. of 259–260° C. was obtained. Analysis indicated 6.32% boron (theory for naphthaleneboronic acid is 6.30% boron).

Additional experiments have shown that zirconium tetrachloride, gallium trichloride and chromium trichloride will catalyze the reaction of boron halide with aromatic hydrocarbons to give the corresponding arylborane.

Additionally, other aryl compounds such as chlorobenzene and biphenyl will react with boron trichloride and boron tribromide in the presence of the foregoing enumerated catalysts to produce the desired arylborane.

The amount of catalyst used is not of primary importance to the present reactions, it only being important that the catalyst is present since the boron halide will not react with an aromatic hydrocarbon to yield the arylborane in the absence of the catalyst.

It has been found that the present borylation reactions are reversible and the rate of conversion of reactants to the arylborane can be increased by rapid removal of the hydrogen halide formed.

The present reactions are easily adapted to a continuous process for making arylboranes.

It is also of interest to note that the present invention can be used to produce arylboranes by employing a vapor phase process as well as a liquid phase process.

Other modes of applying the principle of the invention may be employed, change being made as regards the details described, provided the features stated in any of the following claims or the equivalent of such be employed.

I, therefore, particularly point out and claim as my invention:

1. The method of producing phenyldichloroborane which comprises reacting boron trichloride with benzene in the presence of aluminum trichloride.

2. The method of making benzeneboronic acid which comprises hydrolyzing the product of claim 1 and isolating the benzeneboronic acid from the hydrolysis mixture.

References Cited in the file of this patent

UNITED STATES PATENTS

| | | |
|---|---|---|
| 2,662,917 | Jensen | Dec. 15, 1953 |
| 2,683,169 | Jensen | July 6, 1954 |
| 2,900,414 | Muetterties | Aug. 18, 1959 |

UNITED STATES PATENT OFFICE
CERTIFICATE OF CORRECTION

Patent No. 3,072,715                                          January 8, 1963

George W. Willcockson

It is hereby certified that error appears in the above numbered patent requiring correction and that the said Letters Patent should read as corrected below.

Column 2, line 60, for "Recrystallation" read -- Recrystallization --; column 4, line 9, for "260° C. read -- 262° C. --.

Signed and sealed this 2nd day of July 1963.

(SEAL)
Attest:

ERNEST W. SWIDER
Attesting Officer

DAVID L. LADD
Commissioner of Patents